United States Patent
Holtman et al.

(10) Patent No.: US 9,565,267 B2
(45) Date of Patent: Feb. 7, 2017

(54) EFFICIENT PROXY TABLE MANAGEMENT IN COMMUNICATION NETWORKS

(71) Applicant: PHILIPS LIGHTING HOLDING B.V., Eindhoven (NL)

(72) Inventors: Koen Johanna Guillaume Holtman, Eindhoven (NL); Bozena Erdmann, Aachen (DE)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 183 days.

(21) Appl. No.: 14/376,448

(22) PCT Filed: Feb. 11, 2013

(86) PCT No.: PCT/IB2013/051114
§ 371 (c)(1),
(2) Date: Aug. 4, 2014

(87) PCT Pub. No.: WO2013/121339
PCT Pub. Date: Aug. 22, 2013

(65) Prior Publication Data
US 2015/0006758 A1    Jan. 1, 2015

Related U.S. Application Data

(60) Provisional application No. 61/599,599, filed on Feb. 16, 2012, provisional application No. 61/713,749, filed on Oct. 15, 2012.

(51) Int. Cl.
*H04L 29/08* (2006.01)
*H04L 12/721* (2013.01)
*H04L 12/717* (2013.01)

(52) U.S. Cl.
CPC ......... *H04L 67/2814* (2013.01); *H04L 45/127* (2013.01); *H04L 45/42* (2013.01)

(58) Field of Classification Search
CPC .... H01L 51/04; H01L 45/127; H01L 67/2814; H01L 45/42
USPC ........................................................ 709/244
See application file for complete search history.

(56) References Cited

U.S. PATENT DOCUMENTS

| | | | |
|---|---|---|---|
| 2009/0303926 A1* | 12/2009 | Den Hartog | H04L 12/2809 370/328 |
| 2012/0002547 A1 | 1/2012 | Picard | |
| 2012/0236778 A1* | 9/2012 | Erdmann | H04L 45/22 370/312 |

FOREIGN PATENT DOCUMENTS

WO    WO20100092532 A1    8/2010

* cited by examiner

*Primary Examiner* — Tu Nguyen
(74) *Attorney, Agent, or Firm* — Meenakshy Chakravorty

(57) ABSTRACT

The present invention relates to several techniques for managing the contents of proxy tables in ways that optimize performance, latency, and reliability for communication networks, while ensuring a certain number of early-acting proxies per restricted device. An entity is allowed to keep a required number of proxies per resource-restricted device by removing or adding proxy table entries. Furthermore, the entity is allowed to keep track of early-acting proxies based on forwarding strategies, reporting strategies and/or polling strategies. Thereby, proxy table entries can be controlled to optimize overall system performance and reliability characteristics.

7 Claims, 1 Drawing Sheet

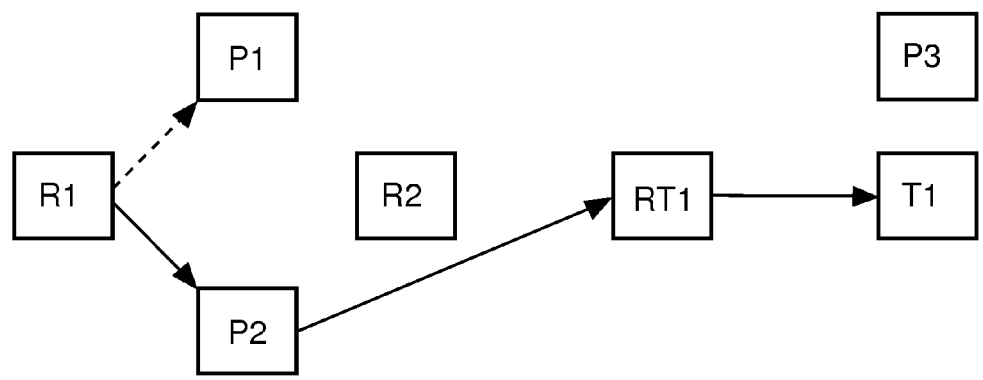

EFFICIENT PROXY TABLE MANAGEMENT IN COMMUNICATION NETWORKS

CROSS-REFERENCE TO PRIOR APPLICATIONS

This application is a U.S. national stage application under 35 U.S.C. §371 of International Application No. PCT/IB2013/051114, filed on Feb. 11, 2013, which claims priority benefit under 35 U.S.C. §119(e) of U.S. Provisional Application No. 61/599,599 filed on Feb. 16, 2012, and U.S. Provisional Application No. 61/713,749 filed on Oct. 15, 2012, the contents of which are herein incorporated by reference.

FIELD OF THE INVENTION

The invention relates to the field of communication networks where proxy devices (e.g. proxy nodes) operate as relay devices (e.g. relay nodes) to forward messages from resource-restricted devices (e.g. resource-restricted nodes), such as—but not limited to—ZigBee Green Power devices (ZGPDs), to their sinks or destination devices (e.g. destination nodes).

BACKGROUND OF THE INVENTION

In wireless network, resource-restricted devices, including energy-restricted devices such as energy-harvesting devices, can be used. Such devices are heavily restricted in the available amount of energy, which limits their offered functionality and influences the network operation, commissioning and maintenance.

One example of such technology is the evolving ZigBee Green Power (ZGP) standard. A ZGP device (ZGPD) is a resource-restricted device which may be powered by energy harvesting and which may not have a battery or which may only have a small storage capacity and can thus transmit and/or receive only at unscheduled opportunities. For example, a ZGPD can be a battery-less switch that can only transmit for a short time once it is actuated by a user and has no reception capability. Another example of a ZGPD can be a battery-less switch that can receive for a short time once it is actuated by a user and has transmitted its signal. Yet another example of a ZGPD is a periodically-reporting sensor, harvesting energy from its environment, e.g., by means of a photovoltaic cell, with or without reception capabilities. If an energy-restricted device is out of range of the device it is configured to control (the device to be controlled referred to as a "sink" or "destination device"), an intermediate device (referred to as a "proxy") is used for forwarding information to the sink. The wireless links between the proxy and the restricted device may appear and disappear during network lifetime, e.g., due to changes in propagation conditions or in relative location of devices, and/or due to devices being added and removed. For system security and performance reasons, the proxies may only forward for restricted devices they have a table entry (i.e. proxy table entry) for, e.g., to be able to perform freshness and/or security check (authentication, decryption). For communication reliability, more than one proxy may be used for forwarding information on behalf of a restricted device.

There are various ways to establish/extend such a proxy table entry, automatically or upon request—e.g. of a user or a maintenance and/or configuration entity. However, the approaches for entry removal currently available in the ZGP specification require user involvement, via commissioning tool usage and/or manual interaction with the restricted device and/or the controlled device (each of which may be installed up in the ceiling), which is cumbersome for large-scale network, such as building automation networks; and may require repeated removal actions if combined with the automatic proxy table creation as available in the ZGP specification today.

Due to the scale of the network and the automatic proxy table creation, there is a need for automatic proxy table management. According to the ZGP specification, it is up to the implemented proxy to choose some management heuristics, i.e., to choose heuristics that pick an entry to delete from a (full) proxy table, e.g. if a new entry must be added; the only recommended method for automatically removing proxy table entries points to these entries with the InRange flag of the Options field set to "0b0", optionally in combination with ZGPDfixed sub-field of the Options field also set to "0b0" (cf. ZGP best practices for ZBA, ZigBee document 11-0196r01, section 5.4.2.1, page 24, line 22-24); or to entries with the EntryActive flag of the Options field set to "0b0", which can be moved to the zgppBlockedZGPDID list (ZigBee document 09-5499r23, section 3.5.2.2.1, line 21-23). Other possible heuristics are left out of scope of ZGP specification; they may refer to experience-based techniques for problem solving, learning, and discovery. Where an exhaustive search is impractical, heuristics are used to speed up the process of finding a satisfactory solution. Examples of such heuritics include using a rule of thumb, an educated guess, an intuitive judgment, or common sense. The most fundamental heuristic is trial and error. There can be some level of freedom for proxy implementers, because though bad heuristic reduces network efficiency and reliability, a bad heuristic cannot lead to long-lasting failure of the network. In the current ZGP specification, there is no performance penalty for proxies having a very full proxy tables, so that aggressive cleaning to shrink a proxy table much below the size of the available memory in a proxy has no beneficial effect.

The current ZGP specification offers some other mechanisms for proxy table maintenance, esp. proxy table entry creation. For example, in the commissioning process (likely with user involvement), the sink or a commissioning tool sends a control announcement (e.g., ZGP Pairing command with AddSink flag set to "0b1"), informing the proxy(s) about the new control relationship created, including an identifier of the restricted device and the corresponding sink(s). This control announcement can be sent by (range-limited) broadcast, with the proxy(s) optionally adding the table only if they are in the range of the limited device, especially if the device indicates fixed location. During operation, proxy table entry creation can be achieved at the proxy by receiving an unsolicited control announcement, or a communication from an unknown restricted device and seeing other proxy(s) forwarding it, or a communication from an unknown restricted device and making a query for control relationships (e.g., ZGP Pairing Search command or broadcast ZGP Notification command). Proxy table entries can be removed after reception of the Decommissioning GPDF (Green Power Device Frame) from the restricted node in commissioning mode (specially triggered on the restricted node), or after reception of a control removal command (e.g., ZGP Pairing with AddSink flag set to "0b0" or with RemoveZGPD flag set to "0b1"), specially triggered on the sink/commissioning tool.

Other automatic proxy table operations mentioned in the ZGP specification are clearing of the first-to-forward flag and/or removing any packets queued for forwarding upon receipt of a forwarded communication by another proxy or a confirmation packet from the sink (cf. ZGP specification, ZigBee document 09-5499-23, section A.3.5.2.1, page 124, line 9-39), or clearing of the first-to-forward flag and removing any packets queued for delivery to the restricted device upon receipt of a request to send to the restricted device with another proxy being nominated (cf. ZGP specification, ZigBee document 09-5499-23, section A.3.5.2.1, page 122, line 43-page 123, line 5).

The above-mentioned approaches allow to determine the status of the proxy table entry. However, due to the unforeseeable schedule of transmissions by the restricted device (which may be dependent on the amount of available energy and/or user interaction) and the unreliable nature of the wireless transmissions, especially from restricted devices which potentially do not use acknowledgements (ACKs) and channel access procedures (such as Carrier sense multiple access with collision avoidance (CSMA/CA)), simple approaches for automatic proxy table removal based on aging (e.g. remove entries that will expire soonest, remove entries that were created earliest, remove entries that were used least) is not appropriate for the restricted devices.

Although several solutions for proxy devices to autonomously take their decisions to create, keep, update or remove a proxy table entry are known, they do not guarantee optimal system performance with efficient allocation of proxies (at required redundancy level) per restricted device.

SUMMARY OF THE INVENTION

It is an object of the invention to provide an efficient management of proxy tables in a network so as to achieve at least one of removal of stale proxy table entries, avoidance of proxy table overflow, avoidance of too many active proxies per restricted device (esp. in dense networks), guaranteeing at least a single proxy per restricted device (in dense networks), and optimal proxy reliability.

This object is achieved by an apparatus, by a proxy device, by a method, and by a computer program product as described in detail herein.

Accordingly, solutions are proposed to manage the contents of proxy tables, in ways that optimize performance, latency, and reliability for the concerned network(s), while optimizing for a certain number of early-acting proxy devices per restricted device. The number of proxy devices that have a proxy table entry for a resource-restricted device is determined for at least one resource-restricted device based on proxy table information, received from the proxy devices and/or other devices in the network and/or based at least in part on observation of the messages sent by at least one of said proxy devices while acting as a relay device for said resource-restricted device. Knowing the number of proxy devices per restricted device (e.g. ZGPD) allows the apparatus (which could be provided at a proxy device, sink device, control device, like e.g. a commissioning tool or a building management system, or another device) to add or remove or confirm or create entries or trial entries. As an example, the number of proxy devices that have a proxy table entry for the resource-restricted device may be determined by transmitting a request for the proxy table entries, e.g. in broadcast to address the proxies, or in unicast to another device storing the entries. Alternatively or additionally, a ratio between the number of times a proxy device that has a proxy table entry for the resource-restricted device has acted for a resource-restricted device and the number of times the resource-restricted device has made a transmission is determined based on information received from the proxy devices and/or based at least in part on observation of the messages sent by at least one of said proxy devices while acting as a relay device for said resource-restricted device, and creation of at least one additional proxy device that has a proxy table entry for the resource-restricted device is initiated if the ratio exceeds a predetermined threshold or removal of at least one proxy table entry for the resource-restricted device is initiated if the ratio exceeds another predetermined threshold. Moreover, proxy table management can be facilitated by forcing the proxy device(s) to report information about known resource-restricted devices. In connection therewith, the proxy device(s) can be adapted to provide monitoring records about resource-restricted devices detected in its/their reception range. These detected resource-restricted devices may not yet be listed in its/their proxy table.

Thereby, it can be ensured that every restricted node has table entries in proxy devices. By ensuring that each resource-restricted device has several early-action capable proxy devices in its transmission range, system reliability can be optimized. Thereby, system performance can be quickly and efficiently improved by efficient allocation of proxy devices (at required redundancy level) per restricted device. The required or desired number of proxy devices per restricted device can be achieved by proxy table management techniques for removing proxy table entries (from a selected proxy device) and/or adding proxy table entries (to a selected proxy device) so as to optimize overall system performance and reliability characteristics.

All solutions as defined in the above independent apparatus, device and method claims relate to interrelated products or alternative solutions to the above object, which are linked by the general common concept of balancing the use of proxy devices for resource-restricted nodes by managing proxy table entries for resource-restricted devices based on shared information about resource-restricted devices and/or related proxy table entries.

According to a first aspect, the number of proxy devices may be determined based on proxy table information, received from the proxy devices or other devices in the network and/or based at least in part on observation of messages sent by at least one of the proxy devices while acting as a relay device for the resource-restricted device. These measures facilitate collection of information from which the number of proxy devices can be derived.

According to a second aspect which can be combined with the above first aspect, at least the determined number of proxy devices that have a proxy table entry for the resource-restricted device may be stored in a proxy counting table, and a proxy device may be removed from the proxy counting table in response to a message (e.g., unicast or groupcast or broadcast message) received from the proxy device or another device, e.g. the sink, and indicating that the proxy device has decided or was instructed to drop the resource-restricted device from its proxy table or to stop forwarding on behalf of it. This measure ensures that proxy information used for proxy table management is kept up-to-date.

According to a third aspect which can be combined with the above first or second aspect, a table entry for the resource-restricted device may be removed or marked as candidate for removal from at least one proxy table or forwarding on behalf of the resource-restricted device may be stopped, if it at least one of the following conditions is determined: existence of more than a predetermined upper threshold of proxy devices with a proxy table entry for or which forward on behalf of the resource-restricted device, proxy devices have insufficient reliability indicators, all proxy devices in a given area or of a given capability have full proxy tables, the threshold changes, restricted device characteristics change, change in the pairings. This ensures that for each resource-restriced device the number of early-action capable proxy devices in its transmission range is kept below the upper threshold.

According to a fourth aspect which can be combined with any of the above first to third aspects, a proxy table entry is renewed by the apparatus at or before expiration of a lifetime of the proxy table entry. Thereby, the apparatus can decide based on available proxy-related information whether a proxy table entry should be maintained even after expiry of its lifetime.

According to a fifth aspect which can be combined with any one of the above first to fourth aspects, an action may be initiated that causes creation of more early-action capable proxies with a proxy table entry for or which forward on behalf of the resource-restricted device, if it has determined at least one of the following conditions: the determined number of proxy devices with proxy table entries for the resource-restricted device (i.e., the number of early-action capable proxy devices) is below a predetermined lower threshold, the existing proxies do not have sufficient reliability indicators, other proxies do have sufficient or better reliability indicators, the threshold changes, restricted device characteristics change, or change in the pairings. Thereby, it can be ensured that every restricted node has a predetermined minimum number of table entries in proxy devices.

According to a sixth aspect which can be combined with any one of the above first to fifth aspects, the proxy device may be adapted to forward a message received from a resource-restricted device for which it has a proxy table entry for forwarding, after expiry of a proxy-specific delay time, and unless it has observed that another proxy has already forwarded the message, wherein the proxy device is adapted to control the proxy-specific delay time so that there is a non-zero probability that this delay time will be lower than that used by other proxy devices in the range of the resource-restricted device, even if the network topology is such that these other proxy devices are better positioned with respect to the resource-restricted device or if the propagation conditions are such that the other proxy devices have better reliability indicators. Thereby, each proxy device will occasionally get a chance to act on behalf of the restricted device. The proxy-specific delay time may be computed by including at least one of a random component and/or a component that is based on a count of the number of recent occasions that the resource-restricted device has emitted a message which has not been forwarded by the proxy device and/or a component that is based on a count of the proxy devices forwarding on behalf of the resource-restricted device. Thereby, faster stability of the active proxy population can be achieved.

According to a seventh aspect which can be combined with any one of the first to eighth aspects, an action is initiated to stop forwarding on behalf of the resource-restricted device and to remove a proxy table entry of a proxy device for the resource-restricted device or to mark the proxy table entry as candidate for removal, if the above ratio between the number of times the proxy device that has a proxy table entry for the resource-restricted device has acted for the resource-restricted device and the number of times the resource-restricted device has made a transmission has dropped below the predetermined threshold or another (lower) threshold. Thereby, proxy devices which are not often used or no longer in the range of the restricted device can be detected and dropped.

According to an eighth aspect which can be combined with any one of the first to seventh aspects, the ratio between the number of times the proxy device that has a proxy table entry for the resource-restricted device has acted for the resource-restricted device and the number of times the resource-restricted device has made a transmission may be determined based on monitoring information about the resource-restricted device, received from proxy devices that do not have a proxy table entry for or do not forward on behalf of the resource-restricted device. Non-early-action capable proxy devices can thus be advantageously involved in proxy table management.

According to a ninth aspect which can be combined with any one of the first to ninth aspects, an action to obtain a proxy table entry for a resource-restricted device or to start forwarding on behalf of the resource-restricted device may be initiated by a second (non-early-action capable) proxy device which does not forward on behalf of the resource-restricted device, if the second proxy device detects that the ratio of another proxy device exceeds a predetermined threshold. Thereby, proxy devices which have not proxy table entry for the restricted device can actively participate in table management.

According to a tenth aspect which can be combined with any one of the first to ninth aspects, the proxy device may be adapted to receive a command message that references a resource restricted device, wherein the proxy device is adapted to execute the command only if it currently has a monitoring record related to a recent message from the restricted device. As already mentioned above, this enhances stability of the active proxy population. The specific command may result in a proxy table entry for the resource-restricted device being added in the proxy device.

It is noted that the apparatus and the proxy device may each be implemented as a discrete hardware circuitry with discrete hardware components, as an integrated chip, as an arrangement of chip modules, or as a signal processing device or chip controlled by a software routine or program stored in a memory, written on a computer readable medium, or downloaded from a network, such as the Internet.

It shall be understood that the apparatus, the proxy device, the method, and the computer program product as described in detail herein have similar and/or identical preferred embodiments.

It shall be understood that a preferred embodiment of the invention can also be any combination of the dependent claims with the respective independent claim.

These and other aspects of the invention will be apparent from and elucidated with reference to the embodiments described hereinafter.

BRIEF DESCRIPTION OF THE DRAWINGS

In the drawings:

FIG. 1 shows a schematic block diagram of a system architecture according to various embodiments.

DETAILED DESCRIPTION OF EMBODIMENTS

Embodiments are now described based on a wireless mesh network containing one or more restricted devices R that can send messages by putting them into packets but are restricted in their ability to send many or long wireless packets, and restricted in their ability to listen for packets over long time periods or receive at all (e.g., devices powered by energy scavenging mechanisms), one or more sink devices T that should receive and act upon messages from the restricted devices R, where the messages may be encoded into one or more packets, and the encoding of the message in a packet may change on a hop-by-hop basis, and the messages can be delivered in anycast, unicast, multicast, groupcast or broadcast communication mode, one or more proxy devices P that help deliver messages from the restricted devices beyond the (radio) range of the restricted devices, and/or help delivering them in the required message format and/or a more reliable by taking special actions (e.g., delivering the message onwards to a sink device T) when they receive a packet from a restricted device. The proxy devices P may typically have more power than the restricted devices so they can do additional message processing, use different message formats with longer messages or messages according to a different protocol, do re-try actions or route discovery actions on behalf of the restricted device, etc. Optionally, one or more router devices RT may be provided, that cannot act as a proxy device but can route messages sent by a proxy device P towards a sink device T. The network is called a 'mesh' network to indicate that there is at least one device that is capable of acting as a relay for a message.

A single device may act as both a sink device T and proxy device P, and also as a router device RT.

FIG. 1 shows a typical network topology in which the present invention can be implemented. The arrows in FIG. 1 show packets that are sent and received to deliver a message from a restricted device R1 to a sink device T1. The dotted arrow indicates that, in this example, the original packet sent by the restricted device R1 is also received by a first proxy device P1, but the first proxy device P1 does not act on it. There are several approaches by which the first proxy device P1 and a second proxy device P2 can coordinate to prevent any wasteful action of them both when forwarding the packet.

As indicated in FIG. 1, the first and second proxy devices P1 and P2 are both proxies that are in the range of the restricted device R1. There are several reasons why it can be beneficial to have a system design in which multiple in-range devices can work or act as proxies for the restricted device R1.

A first reason is reliability. For each message the restricted device R1 may only have limited energy to send packets containing the message. For example, the restricted device R1 may only be able to send two or three packets encoding the message within a very short time window (e.g., defined by the availability of the harvested energy). It also may not be able to perform the required channel access mechanisms and/or wait to receive an acknowledgement frame, all of which may negatively influence communication reliability. In that case, having more proxies around the restricted device R1, which will all listen for and also be able to forward packets from the restricted device R1, increases the chance that at least one proxy will receive the packet with the message $M_i$ and subsequently make sure it is delivered to sink T.

A second reason is mobility. If the restricted device R1 can move around, it may move out of range of any single proxy, the proxy may be moved/switched off or the propagation conditions can change (e.g. due to temporary or permanent space re-arrangements or people movement).

A third reason is to avoid configuration of a restricted device. It may not be possible or desirable to configure the restricted device R1 to hold the network address of a single proxy device. Any message packet sent by the restricted device R1 will therefore automatically be a broadcast/multicast packet, addressed to all or multiple proxy-capable devices (in-range).

Embodiments of the present invention apply to systems with the capability to have multiple proxies for each restricted device R1. In such systems, it is beneficial for speed, efficiency, and reliability if proxies can contain a 'state information', also referred to as 'proxy table information', about restricted devices. Examples of such 'state information' applicable to a single restricted device R1 are (i) identifier of the restricted device (ii) addresses (or identities) of the sink device (or devices) for certain messages from the restricted device R1, in case the restricted device R1 cannot or does not embed this information in its message packets, or other information influencing the forwarding on behalf of the restricted device, e.g. entry status, routing information, alias addresses for the forwarding, (iii) information that makes communication from or to the restricted device R1 more secure, e.g., an encryption key used by the restricted device R1, a security frame counter recently used by the restricted device R1 (frame counters can protect against replay attacks and/or are used as initialization vectors for the key), (iv) information about the quality of the link between the restricted device and the proxy device, (v) restricted device capabilities, and (vi) a message that needs to be sent to the restricted device R1 as soon as it powers up its radio unit and sets it to receive such messages; all or some of them may be stored. Typically, an energy-scavenging device or node might power up its radio unit and set it to receive mode for a short while after it has sent a message packet.

In the embodiments, the term 'proxy table' and 'proxy table information' is intended to cover part or whole of any data structure in a proxy that holds information about, or for, one or more restricted devices, and may contain one or more of the information elements described in the previous paragraph. A proxy table can contain information for one or many different restricted nodes Rx. Thus, in such a system, the proxy table entries need to be created, maintained and used for forwarding the communication of the restricted device, and potentially also removed.

For example, in FIG. 1, it would be beneficial if both proxy devices P1 and P2 would store information for the restricted device R1 in their proxy tables. In case that the restricted device R1 may move around, it is also beneficial if a third proxy device P3 would store that information. However, in most envisaged mesh networks the memory in proxy devices or nodes is limited, so that it will not always be possible to store information about all restricted nodes in all proxy tables of all proxy (capable) nodes.

However, a proxy node that currently does not have any information about the restricted node R1 in its proxy table may still choose to start working as a proxy for that node. Therefore, two types of proxies surrounding a restricted node can be identified. The first type is an early-action capable proxy which has information about restricted devices in its proxy table or forwards on behalf of such restricted devices, and the second type is a non-early-action capable proxy which has no information (yet) about any restricted device in its proxy table, or at least no sufficient information, and thus cannot forward on behalf of the restricted device (R1) at the moment that it receives a message from the restricted device R1. The late acting proxy will first have to obtain the necessary information from elsewhere in the network. It is noted that, throughout the present specification, the terms "active proxies" and "early-action capable proxies" have the same meaning and are intended to be used interchangeably.

The arrangement in a network may be such that each restricted node has in its transmission range at least a few early-action capable proxies. However, in this case, a mechanism may be desirable to prevent that every early-action capable proxy decides to act in all cases when it receives a message from a restricted device in its range. Otherwise, the presence of multiple early-action capable proxies may cause an increase in message delivery latency or even a decrease in delivery reliability. One of such envisaged prevention mechanisms could be to inform other proxies in range of a restricted device, if a certain proxy device acts on a received message from the restricted device R1. If other proxy devices are informed about the act of the certain proxy device, they can refrain from acting themselves. Such an information mechanism can be implemented as follows. Suppose that the first proxy device P1 has received a message $M_i$ from the restricted device R1 and now has to decide if to act or not. It will then start a timeout counter and listen to the network channel. If it sees a packet from another proxy device, e.g. the second device P2, containing a payload that indicates that the second proxy device P2 acted on the same message $M_i$ of the restricted device R1, then the first proxy device P1 decides not to act and stops the counter. If the counter runs to zero without receiving a packet from the second proxy device P2 for the message $M_i$ of the restricted device R1, then the first proxy device P1 becomes active and acts for the restricted device R1. Because of differences in network sending ranges and some inherent unreliability of wireless packet delivery, mechanisms like this will not inhibit in all cases that multiple proxies decide to act on the same message from the restricted device R1. Therefore, it is envisaged that there are also mechanisms, e.g. in the sink nodes, to filter out duplicate messages from multiple proxies that all acted.

In the upcoming ZGP standard, the following mechanisms are used for active and valid proxy table entries (cf. ZGP specification, ZigBee document 09-5499-23, section A.3.5.2.1, page 124, line 9-39). In case of unicast forwarding, the proxies having a proxy table entry for a particular restricted device, calculate the forwarding delay based on criteria such as quality of the received signal from the restricted device, availability of unicast routes to the sink devices, and the fact of being the first to forward in the past. On expiration of a forwarding delay, a proxy device sends a ZGP Tunneling Stop message in 2-hop broadcast, with alias network source address and alias network sequence number, both derived from the information in the GPDF, to inform other proxies, and subsequently sends the ZGP Notification(s) messages in unicast. On reception of the ZGP Tunneling Stop message for the same ZGPD command within the forwarding delay, a proxy cancels its own scheduled transmission. In case of groupcast communication for GPDF indicating reception opportunity, those proxies having a proxy table entry for a particular restricted device calculate the forwarding delay as described above (leaving out the availability of unicast routes to the sink devices). On expiration of the forwarding delay, a proxy sends ZGP Notification message(s) in APS (Application Support Sublayer) multicast, and it includes its short address and the indicator of quality of the signal received from the restricted device R1. On reception of the ZGP Notification message for the same ZGPD command within the forwarding delay, if the ZGP Notification has better quality indicator or equal quality indicator and lower short address, a proxy device cancels its own scheduled transmission. In case of groupcast communication for GPDF not indicating reception opportunity, the proxy devices having a proxy table entry for a particular restricted device forward the ZGP Notification message(s) in APS multicast, with alias network source address and alias network sequence number, both derived from the information in the GPDF, which makes the independently-generated ZGP Notification packets look identical to the Broadcast Transaction Table of ZigBee. The same mechanism can be used by sinks capable of sink table based groupcast forwarding (cf. ZGP specification, 09-5499-23, section A.3.5.2.5, page 135, line 28-35).

If the proxy device succeeds in transmitting the ZGP Notification, it sets the first-to-forward flag of its proxy table entry to "true" and clears it upon reception of a ZGP Notification Response message from a unicast sink with first-to-forward flag set to "false" (cf. ZGP specification, 09-5499-23, section A.3.5.2.1, page 124, line 9-39). The sinks filter the received ZGPD commands based on the ZGPD identifier (SrcID), the frame counter value, and the communication mode; additional duplicate filtering is performed by lower layers (cf. ZigBee Green Power specification, 09-5499-23, section A.3.6.1.2).

The proxy table entries need to be initially created. They can be for example be created as part of the commissioning process, involving a user and/or a tool. Proxy table entries could also be created automatically. A non-early-action capable proxy that decides to act for a restricted node can, at the end of the action, end up with sufficient information to create a proxy table for the restricted device in itself. A non-early-action capable node that can overhear communications allowing it to make an extra proxy table entry may decide to do so, especially when it has free space for more entries available.

It is assumed that a proxy device (over)hears information about a restricted node being sent around in the network, that allows it to add the restricted device to its proxy table and become an early action capable node for the restricted device. Especially in case that the proxy device did not receive any message from the restricted device (yet), i.e., it may not (yet) be in range of the restricted device. The proxy device might for example hear a broadcast- or multicast-type message, intended for all interested nodes, informing them about the node restricted node. How should the proxy Px decide whether it should add the restricted device to its proxy table, especially if this means it has to delete another entry from the proxy table? Assistance methods for such a decision are discussed below.

In the upcoming ZGP standard, the following mechanisms are used for configuring information into proxy tables (cf. ZGP specification, 09-5499-23, section A.3.5.2.1, page 122, line 17-41; section A.3.5.2.2.2, page 127, line 2-21; section A.3.9). As part of a successful commissioning procedure, a ZGP sink (ZGPS) or a ZGPCT (ZGP commissioning tool) sends a ZGP Pairing message with AddSink flag set to "0b1" (cf. ZGP specification, 09-5499-23, section A.3.5.2), typically as a network wide broadcast, carrying i.a. the SrcID (i.e. the identifier of the restricted device ZGPD), security settings, if any, and the required communication mode for the forwarding. On reception of the ZGP Pairing, the proxy devices create/extend the proxy table entries with the supplied information. For sinks capable of sink-table-based forwarding, sink table entries are created upon reception of a ZGP Pairing Configuration command, which can be sent by another ZGPS or ZGPCT or another management device (cf. ZigBee Green Power specification, 09-5499-23, section A.3.3.4.7; section A.3.5.2.5 page 132, line 27-page 134, line 27).

Old/superfluous proxy table entries should be removed automatically if possible. However, the restricted devices may have very irregular transmit patterns, dependent e.g. on the availability of energy and/or a user trigger. One way to manage proxy tables may be to use 'least recently used' replacement strategies. Under the 'least recently used' strategy, if a proxy device needs to add a restricted device to its proxy table, which is already full, it will drop a node $R_i$ that it least recently used, wherein the node $R_i$ may be selected as being the node, among all nodes in the table, on behalf of which the proxy device acted as a proxy least recently (furthest in the past), or may be selected as being the node, among all nodes in the table, that the proxy device observed least recently as emitting any message.

However, there are problems with such 'least recently used' replacement strategies. Suppose that proxy tables are limited to 5 entries, and a network contains 15 proxy devices (nodes) and 15 restricted devices (nodes), with all of these within receiving range of all others. Suppose that 10 of the restricted devices are temperature sensors that report data every minute, and 5 are light switch buttons that are used on average once per day. In this case, there is a high probability that, every morning, no matter what exact 'least recently used' replacement strategy is used, all proxy tables in all proxy devices will have filled up with data about the temperature sensors, with all light switches having disappeared from the tables. Depending on the design of other aspects of the network, this will make the light switch message processing slow, unreliable, or even impossible. So a better strategy than 'least recently used' is needed. The 15 proxy devices have 15*5=75 table entries among them, so it should be possible to have every one of the 15 restricted devices present in the proxy table of at least one proxy device.

Another way to manage proxy tables would be to use 'first in first out' replacement strategies. That's obviously suboptimal as well, since it does not take into account any restricted device activity or importance.

A fallback solution may be to involve the user in the removal of the proxy table entries.

The upcoming ZGP standard offers the following mechanisms for proxy table entry removal.

The removal of a ZGPD device from the network, including removal of the related proxy table entries, can be triggered by a ZGPD sending the ZGPD Decommissioning command and/or by the sink/commissioning tool sending the ZGP Pairing command with RemoveZGPD flag set to "true" (cf. ZGP specification, 09-5499-23, section A.3.3.5.2). Both actions are expected to be triggered by the user. The removal of a particular pairing (i.e. sink information) from the proxy table entry can be triggered by a sink/commissioning tool sending the ZGP Pairing command with AddSink flag set to "false" Sinks can remove stale unicast pairings by sending a ZGP Notification Response with NoPairing flag set to "true" (cf. ZGP specification, 09-5499-23, section A.3.3.5.1). It is recommended for proxy devices operating in the building automation scope to clear the proxy table entries with the InRange flag set to "false" (cf. ZGP best practices for ZBA, ZigBee document 11-0196r01, section 5.4.2.1, page 24, line 22-24). Proxies can also have entries with the EntryActive flag of the Options field set to "0b0", which can be moved to the zgppBlockedZGPDID list (ZigBee document 09-5499r23, section 3.5.2.2.1, line 21-23).

While the table entries for unknown restricted devices may be discovered "just in time", e.g., when first observing a command from the device, and once removed/invalidated table entries can be re-discovered/activated again, care must be taken that bad heuristics do not lead to grave failure of the system. Imagine a portable emergency button, intended to be operated when the bearer requires assistance. Having it realized as a resource-restricted device, e.g. energy-harvesting device, may be beneficial, as this guarantees that one does not have to deal with empty batteries/battery replacement. A pairing with a sink device may be created. But the button will be operated very rarely (say a couple of times a year), possibly each time in a different location (as its bearer moves); and even the maintenance operations, if any, may be infrequent (e.g. every two weeks). If, upon button activation, no proxy has the table entry, in one envisaged system implementation the message will not be forwarded and a query may be sent instead; and the query result may only be used for forwarding the next message. However, the current critical alarm may not get forwarded.

According to a first embodiment, for at least one restricted device, there is at least one table managing entity in the system that determines (occasionally) at how many proxies have proxy table entries for the restricted device. The table managing entity can be at least one of the proxy devices forwarding on behalf of the restricted device, at least one of the sinks paired to the restricted device, or another device, e.g. a centralized maintenance device(s), like e.g. ZigBee Trust Centre, ZigBee Coordinator, ZigBee Network Manager, a commissioning tool or other type of controller/manager node, in or outside the network, e.g. the building management system. Apart from keeping active proxy count, additional information can be stored, including one or more of identifiers of the active proxies, reliability indicators of the active proxies, capabilities of the active proxies, filling levels of the tables of the active proxies, location of the active proxies, etc.

The need for determining the number of active proxy devices, and the exact way of determination and actions resulting from the determination may differ per restricted device, for example taking into account criteria like restricted device type, application, mobility, reporting interval, or individual characteristics of the restricted device. The characteristics may include e.g. importance and location of the node (e.g. local propagation conditions), or the forwarding mechanism (e.g. unicast, groupcast, wildcard proxy table entry).

The target number of early-action capable proxy devices per restricted device, or alternatively a lower and upper threshold for the number of proxy devices may be determined globally, fixed by a standard, or a policy of particular network or vendor. Furthermore, it may be dependent on device type, application, mobility, reporting interval, individual characteristics of the restricted device, e.g., importance and location (e.g. local propagation conditions) or the forwarding mechanism (e.g. unicast, groupcast). The target number or thresholds may change over the lifetime of the network, e.g. triggered by the sink, management entity, or caused by some configuration change, e.g. change of reporting frequency of the restricted device or change in the pairings. Furthermore, additional conditions for selection of the early-action capable proxies can be defined, as described below (cf. the comparison criteria described below).

Though adding more early-action capable proxy devices for a restricted node can increase reliability, it could also cause extra network traffic, so that the optimization criterion should not necessarily be to maximize the number of early-action capable proxy devices. A table managing entity may keep the number of early-action capable proxy devices per restricted device above a lower bound, but this may be combined with a table managing entity to keep the number of early-action capable proxy devices under a certain lower bound threshold. If additional conditions for the early-action capable proxies are defined (cf. the comparison criteria described below), the fact of a proxy starting or ceasing to meet those conditions may also lead to its addition to/removal from among the early-action capable proxies. For example, if an early-action capable proxy does no longer meet the minimum reliability indicator condition, it can be removed from the active proxy (counting) table. In another example, if all proxy devices in range of a particular restricted device R2 having a particular capability, e.g. capable of unicast forwarding, have their tables full, and a new unicast proxy table entry for a restricted node R2 is needed, a groupcast table entry for another node R1 in the same range can be initiated on at least one of those proxies, and if required added to a proxy table of one or more groupcast-capable proxies in range of R1.

The proposed solution of keeping at least an active proxy count in the proxy table can be combined with a mechanism that causes a proxy device to be dropped from the active proxy (counting) table in the table managing entity if this proxy device has been inactive, as a proxy device in general or as a proxy device for the concerned restricted device specifically, for a long time, or if this proxy device has decided or has been instructed to drop the restricted device from its own proxy table(s). A proxy device dropping a device from its table might for example send a broadcast message announcing that it has done so, or this information may be derived from its proxy table information. Alternatively, the need of dropping the proxy device from the active proxy table for a given restricted device can be derived from the command instructing the proxy to remove its proxy table entry for this restricted device.

Furthermore, the above proxy counting solution can be advantageously combined with an autonomous dropping of a table entry for a particular device by a proxy device, if it never, rarely or never in a recent time interval of a given length gets the chance to act as an active proxy device. Thus, it would allow to also remove such proxy devices that will never be of use to the restricted device.

In the first embodiment which is based on table managing entities counting proxy devices with upper bound threshold, if a determination indicates more than a certain upper threshold of proxy devices forwarding on behalf of a certain restricted device, the table managing entity takes an action that causes some proxy table entries to be dropped.

To identify a proxy device that should keep a proxy table entry and/or a proxy device that should drop the proxy table entry, the table managing entity may use at least one of comparison criteria like a reliability indicator, e.g., based on signal strength or distance between the proxy device and the restricted node, or reliability indicators indicating how often does the proxy device receive/miss communication from the restricted node, number of entries in the proxy table of the proxy device for which the proxy device is very active (e.g., if this number is larger, than it may be more beneficial for this proxy device to drop one entry), the capabilities of the proxies, e.g. in terms of supported security or communication modes, a comparative rate at which this proxy device acts for the restricted node, compared to other proxy devices, and other characteristics of the proxy devices, e.g. the relative position of the proxy devices with respect to each other (for example, it may be better to select active proxy devices which are not each other's neighbors, to limit the risk that they are subject to the same propagation disturbance), the connectedness of the proxy device to the network, e.g. number of (router) neighbors it has (it may be better to use well connected proxies, as the multitude of potential routes should increase the reliability of the messages they forward), and the overall reliability of the communication of this proxy device (e.g. as indicated in the link quality reported by its neighbors).

In one implementation example of the first embodiment, messages already exchanged for another purpose may be used for determination. As a more detailed example of this, a sink device for a restricted device may keep track of the identities of the proxy devices that forward messages on behalf of the restricted device to it. This can be done for example by obtaining the identities of the forwarding proxy devices from the messages they send, and storing these in an 'active proxy counting table'. If the number of active proxy counting table entries increases beyond the upper threshold, the sink device can select a proxy device from the 'active proxy counting table', e.g. based on one or more of the conditions described above, and sends a message to this proxy device telling it to drop its proxy table entry for the restricted node, or to make the table entry a strong candidate for dropping if the proxy device needs a to add another restricted node to its table.

In another implementation example of the first embodiment, for a restricted device, one or more of early-action capable proxy device may keep a record by means of an active proxy counting table of those proxy devices it observed to be early-acting for that restricted device. For example, it can do this by listening to the messages sent by these proxy devices. If it receives a message indicating that another proxy device has early-acted, and the identity of that proxy device can be derived from the message, it can store the identity of the new proxy device in an active proxy counting table. If the number of active proxy counting table entries increases beyond an upper threshold, and/or the other proxies better meet the additional conditions for the early-action capable proxies, the proxy device can decide to drop its own proxy table entry for the restricted device (or make it a strong candidate for dropping as soon as a new proxy table entry needs to be added), or—e.g. based on one or more of the additional conditions for early-action capable proxies described above—select another proxy and ask that one to drop its proxy table entry.

In the upcoming ZGP specification, the address of the message originator, i.e. early-action capable proxy or sink device capable of sink-table-based forwarding, can be determined from the Tunneling Stop, ZGP Commissioning Notification and/or ZGP Notification Green Power cluster messages it sends. If alias is not used, the address of the message originator, the proxy that proxy that early-acted, can be determined based on the NWK source address field or the ZGPP/TempMaster Short address field, if included. If alias is used, the address of the message originator, i.e. proxy that early-acted, can be determined from the MAC source address, if the NWK header Radius field in the received message has its initial value. The message(s) can further contain the reliability indicators for the early-acted proxy, e.g. the Distance field. These messages can be received by other proxies and by the sinks.

The removal of the proxy table entry can be performed by sending in unicast to the selected proxy device a ZGP Pairing command, with the AddSink sub-field set to "0b0" or with the RemoveZGPD sub-field set to "0b1" (cf. ZigBee Green Power specification, 09-5499-23, section A.3.3.5.2). Removal of the sink table entry can be performed by the ZGP Pairing Configuration command, with the Action sub-field of the Actions field set to "0b011" or "0b100" (cf.

ZigBee Green Power specification, 09-5499-23, section A.3.3.4.7; section A.3.5.2.5 page 132, line 27-page 134, line 27).

According to a second embodiment, at least one table managing entity is provided for keeping track of how many proxy devices are registered for a restricted node and for comparing this number to a lower bound threshold. If there are too few early-action capable proxy devices, or too few early-action capable proxy devices meeting the additional criteria for early-action capable proxies, or there are some non-early-action capable proxy devices available, meeting the additional criteria for early-action capable proxies, the table managing entity takes action that causes more active proxy devices (in-range early-action capable proxy devices) to be created. The track-keeping table managing entity here may not be the same as the entity that takes actions based on an upper bound threshold. Track-keeping procedures may be, for example, as described above or below. The entity can be at least one of the proxy devices forwarding on behalf of the restricted device, at least one of the sinks paired to the restricted device, or another device, e.g. a centralized maintenance device(s), like e.g. ZigBee Trust Centre, ZigBee Coordinator, ZigBee Network Manager, a commissioning tool or other type of controller/manager node, in or outside the network, e.g. the building management system.

According to a third embodiment, adding and removing of proxy table entries is controlled based on global knowledge. Here, the deciding table managing entity may be another device, e.g. a powerful node, for example a network gateway node (e.g. edge router or 6lowpan LBR), a network manager (like e.g. ZigBee Trust Centre, ZigBee Coordinator, ZigBee Network Manager), or other type of controller/manager node, e.g. a building management system device or a commissioning device, in or outside the network (e.g. on the Internet). Its decisions may be based on long-term statistics. In an example, the table managing entity may regularly collect proxy table contents from all proxy devices and/or proxy information form another devices, e g sinks, controllers, gateways, and commissioning tool(s), and may also collect, or cause to be generated, other data related to the network topology. Occasionally, the entity reviews its records, and decides on the proxy table contents to optimize the network performance, and then updates the proxy tables by sending out respective messages to the proxy devices. For example, the table managing entity can gather permanent and transient entries from proxy tables to create a long-term historical record in its memory about which proxies are in reception distance of which restricted node. In a further example, the table managing entity can collect other information about the proxy operation, including proxy's location, proxy's network membership, proxy's neighbor information, proxy's routing information, proxy's reliability information, proxy's load, including own application traffic and other routed traffic, proxy's capabilities, etc. Further, the table managing entity can have access to other data, e.g. floor plan with detailed proxy location, room/zone placement, obstacles, presence of external interferers, etc. The table managing entity can then (re)allocate proxy devices to restricted device, trying to aim for a global criterion that each restricted node should have at least a predetermined number of early-action capable proxy devices within its range if at all possible, wherein the number of the proxy devices is possibly dependent on the restricted device's characteristic(s), as described before, and wherein the early-action capable proxies may optionally need to fulfill the additional proxy criterion/criteria, as described before.

In the upcoming ZGP specification, the table managing entity can collect the information about the devices forwarding on behalf of the ZGPD by reading proxy tables of the proxy devices, e.g. using the ZCL Read Attributes command and Sink Tables and Translation Tables of the sink table-based forwarding capable sinks, using the ZCL Read Attributes and the ZGP Translation Table Request commands (cf. ZigBee Green Power specification, 09-5499-23, section A.3.3.4.5). The tables can be managed by sending ZGP Pairing/ZGP Pairing Configuration commands for proxies/sinks, respectively. Writing to the table attributes via ZCL Write Attributes command may be possible as well.

A command requesting all devices having entries for a particular ZGPD may be introduced, to simplify the initial search of the table managing entity. For example, the ZGP Pairing Search command (cf. ZigBee Green Power specification, 09-5499-23, section A.3.3.4.2), in the current ZGP specification only meant to discover the sinks paired to a particular ZGPD, may be extended, to indicate which devices (proxies and/or sinks) are to respond to this request. This can be achieved e.g. by adding a ProxyResponse sub-field in the now-reserved sub-fields of the Options field, indicating—if set to "0b1"—that proxy devices with a table entry for this ZGPD are to respond to this request as well. Alternatively, the proxy devices could be triggered to respond to the ZGP Pairing Search by setting all the mode request sub-fields (Request Unicast Sinks, Request Derived Groupcast Sinks, Request Commissioned groupcast sinks) to "0b0". This has the additional benefit of suppressing the responses from the sinks. The pairing information in the sinks is usually expected to be more static than the proxy table entries. Sink table based-forwarding capable sinks may respond to this request as well, or could be requested to report separately, e.g. by an additional flag. Furthermore, proxy table entries of particular type or entry class could be requested, e.g. only proxy table entries for the restricted devices out of radio range of the proxy (i.e. with the InRange flag of the Option field of the proxy table entry set to "0b0"; cf. ZGP specification, 09-5499-23, section A.3.4.2.2.1) or only inactive and/or invalid proxy table entries (i.e. EntryActive and/or EntryValid flag of the Option field of the proxy table entry set to "0b0"; cf. ZGP specification, 09-5499-23, section A.3.4.2.2.1), or only trial/self-created entries; additional indicators for this requests may need to be added, e.g. using the now-reserved sub-fields of the Options field of the Pairing Search command. The response to such a request could be a complete proxy table entry, or a new command carrying selected information, e.g. identical or similar to one of the reporting commands discussed in this invention.

Further, the ZGP Pairing Search command could be used for discovering all restricted devices which use a particular communication mode, e.g. if the communication mode is indicative of the need of the proxy table maintenance and/or of the restricted device's application and/or device type. This could be for example achieved by setting the appropriate mode request sub-field (Request Unicast Sinks, Request Derived Groupcast Sinks, Request Commissioned Groupcast Sinks) of the Options field of the ZGP Pairing Search command to "0b1" and setting the ZGPD SRcID field to a specific value, e.g. "0xffffffff". Similarly, other ZGPD capabilities, if indicative of the need of the proxy table maintenance and/or of the restricted device's application and/or device type, could be requested, e.g. ZGPD devices using particular security level or key type, portable ZGPD devices, ZGPD devices capable of bidirectional communication, etc.; additional indicators for this requests may need to be added, e.g. using the now-reserved sub-fields of the Options field.

In another example, a dedicated command for requesting all devices having entries for a particular ZGPD and/or ZGPD of particular capabilities may be introduced.

An example of a table managing entity applying a global criterion follows. First, it uses network status inspection means, e.g. the above ZGP command(s), to build up a complete snapshot of all current nodes in the system: restricted devices, proxy devices, and sink devices. The snapshot contains the network addresses for each device. It also contains, for each restricted device, the identities of all proxy devices that currently have a restricted device in their proxy table. It may also contain, for each restricted device, the nature of the device, for example it is a periodically reporting sensor node that does not require a high reliability for delivering each message, or a human-operated light toggle switch node that does need high reliability, or other characteristics. The information may also contain, in systems that allow for mobile restricted nodes (e.g. portable remote controls), information whether the restricted device is stationary or mobile. As not every proxy device will be in range of every restricted device, the table managing entity also collects information about which proxy devices are in range of which restricted devices, which may or may not be the same proxies that currently have a restricted device in their proxy table. Typically such information will not be a binary flag in range "yes" or "no" per proxy-restricted device pair, but rather an estimate of the distance, signal strength, and/or packet loss rate between the pair. Such information might be based for example on a known floor plan of the building with the locations of all proxy devices and restricted devices. Such information could also be collected dynamically, e.g., by recording statistics about packet reception and signal strengths. Further, per proxy device, information about proxy capabilities and status may be stored, e.g., supported communication modes, supported security levels, and/or total number of proxy table entries occupied/free. Further, per sink device, it may store some application, capability and status information, e.g., the communication mode supported and required, potentially determining the communication mode and/or number of proxies required for the restricted devices paired to this sink.

Then, the table managing entity of the third embodiment uses some or all of the above information to determine a target minimum number of proxy devices T(Rx) for each restricted device. For example, in a system where there are exactly NR restricted devices that are all stationary switches, and where there are NP proxy devices, each capable of having at most 5 proxy table entries, T(Rx) could be computed as:

$$T(Rx)=\min(N\min,\mathrm{floor}((NP*5)/NR)) \quad (1)$$

With 'floor' being the function (from the C standard library) that rounds down a number to an integer, and Nmin being an exemplary application defined minimum. For example, if NR=11 and NP=5, this calculation gives floor=2, and thus, if Nmin=4, T(Rx)=2 for each restricted device.

After computing this T(Rx), the table managing entity identifies those restricted devices that have currently less than T(Rx) proxy devices with a proxy table entry for them. For these restricted devices, the table managing entity takes action to add proxy table entries.

In one approach to add entries for a restricted device, the table managing entity selects a proxy device that does not yet have the concerned restricted device in its proxy table, and then sends commands to this proxy device that cause the concerned restricted device to be added to the table of this proxy device. To select this new proxy device, the table managing entity can search the information it collected from the network until it finds a proxy device that is in the range of the restricted device (or likely in range of the restricted device) and has free space in its proxy table, or has at least one other restricted device in its proxy table for which the number of proxy devices that have the other restricted device in their proxy table exceeds the above target minimum number T(Rd) for the other restricted device. If the above approach results in multiple choices for selecting the new proxy device or the other restricted device, the table managing entity can take additional proxy criteria (as described above) into account in the proxy selection, e.g. proxy capability and reliability indicator, e.g. based on RSSI or distance.

If proxy table space needs to be created for a restricted device, a selected other restricted device can be deleted from the proxy table of the selected (new) proxy device. Therefore, the proposed solution according to the third embodiment also causes proxy table entries to be removed.

Furthermore, the entity may replace one proxy with another proxy, which (better) fullfils some additional proxy criteria.

In the following, different ways of adding or creating new active proxies for a restricted device in the above embodiments are discussed.

In a first example, a unicast message is sent to one or more selected proxy devices, instructing them to add a table entry for the concerned restricted device. This solution is applicable in cases where the table managing entity has enough memory to store information about the network topology, or other historical information indicating which proxy devices are likely to be in range of the restricted device, or a list of proxy devices which in the past did act on behalf of this restricted device, using a specific or "wildcard" proxy table entry, or proxy devices which did a search for this restricted device, e.g. within a limited time period in the past. In the ZGP specification, this could be achieved with a unicast ZGP Pairing message or directly by writing to the proxy table.

In second example, a limited-hop-count broadcast message could be sent, originating from a device, e.g. a proxy or a sink, that is known to be close to, or in range of, the restricted device, instructing some or all receiving proxy devices to add or activate a table entry for the restricted device. Here, the created entry could be seen as a "trial" entry. It is however noted that such a "trial entry" can be used independent of the table managing entity, i.e., it can also be created by the proxies themselves. For example, the proxy device may instruct some if its neighbors to add a table entry, or instruct them to ask among their neighbors. In another example, a sink device may instruct some of its neighbors, proxies and/or sinks, to add a "trial" table entry.

Proxy devices and devices capable of proxy functionality, e.g., sinks capable of sink-table-based forwarding, may be configured to differentiate between "trial" entries, established to find all or best proxy devices, and other types of entries like self-configured entries, out-of-the-box or default entries, and/or managed entries, created after selection by an entity. The proxy devices may derive the settings themselves, e.g. based on a table creation procedure (e.g. command received, command originator, command communication mode), or it may be explicitly part of the message itself. Thus, the trial and/or self-configured table entry can be dropped quickly at a later moment, e.g. when more space is needed, if the proxy device has not acted even once as an early-action capable proxy device during the time period since the entry was added until the later moment, and/or if it has not observed any message being emitted from the restricted device during that time period.

The trial entries can be set such that the chance of the new proxy device to initially early-act for the restricted device is increased, such that their presence gets known and their reliability can be estimated. In the upcoming ZGP specification, this may be accomplished by setting the first-to-forward flag of the new proxy entries to "true" (cf. ZigBee Green Power specification, 09-5499-23, section A.3.4.2.2.1).

In an extension, the "trial" entries at the proxy devices selected to be early-action capable proxies may be confirmed by the table managing entity, and turned into managed entries. In the ZGP specification, this could be achieved with ZGP Pairing or ZGP Configure Pairing message and/or by directly writing to the proxy table or sink table. Furthermore, the trial entries at some proxy devices not selected to be early-acting proxies may be removed, e.g. by contacting those proxy devices individually (if known), or else by sending a broadcast command indicating that the "trial" is finished.

In the context of the ZGP specification, messages to carry some of the above instructions can often be advantageously embedded into message packets that carry other information or commands, too. For example, inside a ZGP Tunneling Stop message and/or ZGP Notification message. This provides the additional advantage that the newly added active proxy device will immediately announce itself to the sinks via the ZGP Pairing Search message to complete the proxy table entry.

Furthermore, this could be accomplished by the table managing entity by sending a ZGP Pairing command (with AddSink flag="0b1") and/or a ZGP Configure Pairing command and/or by directly writing to the proxy table or sink table. The commands shall allow the receiving devices to identify, that the sender is another proxy device and/or that the message is an attempt to increase the number of proxy devices. It may be implicit, e.g. by the delivery mode used (e.g. broadcast communication always means trial entry). It may also be explicit in the command. For example, a trial flag can be defined in the now-reserved sub-fields of the Options field of the ZGP Pairing command and be set to "true", or a "temporary/managed entry" flag can be defined in the now-reserved sub-fields of the Options field of the ZGP Pairing command and set to "temporary entry". If sent in unicast, the message preferably allows for replying with the ZCL default response, e.g. in case when the receiver does not support the ZGP feature or if it doesn't have any or the required proxy capabilities, or if the proxy table is already full. The ZGP Pairing command with the AddSink flag="0b0" and/or the RemoveZGPD flag="0b1" and the trial flag="0b1" or the "temporary/managed entry" flag="temporary" may be used to remove unconfirmed entries, also using groupcast or broadcast. An additional command may be defined for this purpose. The table managing entity can choose from among its neighbors, advantageously those who are not yet known of forwarding on behalf of this ZGPD. Further, the table managing entity may further exclude sinks, all or those known not to be capable of sink-table based forwarding. Advantageously, the proxy devices would already have a list of SrcIDs they are in range of but not actively forward upon. Advantageously, during or soon after this additional proxy selection, the ZGPD could send a message to let the proxy devices confirm the reception or distance or reliability estimation, etc. The selected proxy device, if in close distance to the ZGPD, may fake the ZGPD transmission to emulate it.

The above first to third embodiments may be enhanced by providing the following additional measures in the proxy devices to make it more easy for other entities to count them and/or to gather proxy related statistics.

In a first enhancement, a proxy device may periodically send a broadcast message that contains identities of restricted devices in its proxy table, e.g., all or only those restricted devices which fulfill certain criteria (e.g. the need for proxy table maintenance, those in range, those the proxy actively forwards for). Table managing entities receiving such broadcast messages can use them to update their active proxy counting tables. The message may also include additional information which can be used for proxy table maintenance, e.g. proxy distance, etc.

In the ZGP specification, the entire ZGP proxy table could be sent, e.g. in a ZGP Attributes Report. Alternatively, a dedicated command carrying only the relevant data could be defined, e.g. similar in format to the ZGP Tunneling Stop command. In the upcoming ZGP specification, if unicast forwarding is used and/or if the ZGPD supports bidirectional operation, the proxy devices already forwarding on behalf of a ZGPD may be encouraged to keep forwarding. This may then be achieved by having the proxy devices schedule the forwarding after a delay, the Tunneling Delay, calculated based on the specific information, e.g., as define in the ZGP specification: received signal strength indication (RSSI) of the received GDPF (Green Power Device Frame), the fact of being first to forward in the past, and—in the case of unicast—availability of all unicast routes to the paired sinks; extended with an additional component to increase the proxy's forwarding probability, independent of network topology or reliability indicators.

In a second enhancement, proxy devices are controlled to emit messages with predictable regularity (i.e. non-zero forwarding probability). To achieve this, the system may be adapted to ensure that each early-action capable proxy device in the range of a restricted device has a non-zero probability of sending a message, thus informing the sink and/or the entity(s) about its status as an early-action capable proxy device for the restricted device, wherein this non-zero probability is significantly above zero, no matter what the local network topology around the restricted device is or what are the reliability indicators of the other proxies forwarding on behalf of the same restricted device.

In one example of this second enhancement, a proxy device that receives a message from the restricted device, and that has the restricted device in its proxy table, may perform a 'reporting action' on average once in every N times, where N is 10 for example. The mechanism that creates the 'once every N times' behavior could be a counter counting down from N, or a random number based mechanism that generates a 'yes' decision on average every $1/N$ times. N may be derived from the number of proxies forwarding on behalf of the restricted device, or the actual number of early-action capable proxy devices available for this restricted device. If N is the actual number of early-action capable proxy devices available for this restricted device, or the target number to be realised, then the entity that is managing the proxy population could send this N to the proxy in a configuration step. In another embodiment, the actual number of early-action capable proxy devices available for this restricted device can be derived at least in part based on observation of the forwarding behaviour of other proxy devices forwarding on behalf of the same restricted device.

The above reporting action may be a message sending action that allows other entity(s) to know about the proxy's status as a proxy device for the restricted device. One way to realize the reporting action may be to make the proxy device send a broadcast/groupcast ZGP Notification message or unicast ZGP Notification message even though the proxy device has determined that this is not necessary anymore to get the message from the restricted device delivered to its recipients, the message beneficially including clear identification of the sending proxy. Other messages can be sent (periodically).

In the context of the upcoming ZGP specification, such a message can for example be a unicast ZGP Notification (cf. ZGP specification, ZigBee document 09-5499-23, section A.3.3.4.1) message to at least one sink device of the restricted device, with the same payload and sequence counter contents of the restricted device as sent by the early-acting proxy device (if any), but its own address as the unicast sender. Or a unicast ZGP Notification or another message to another entity capable of proxy table measurement, e.g., that specified in a wildcard table entry.

Furthermore, in the context of the upcoming ZGP standard, if the restricted device has a multicast group as its sink, the proxy device may send a unicast or multicast or broadcast message reflecting its proxy table contents, or a ZGP Notification (cf. ZGP specification, ZigBee document 09-5499-23, section A.3.3.4.1) or ZGP Tunneling Stop (cf. ZGP specification, ZigBee document 09-5499-23, section A.3.4.4.1) message sent without the alias.

If the track-keeping table managing entity is a proxy device or another device in-range of the restricted device and/or the proxies forwarding on its behalf, derivation of the proxy information from the aliased message (as described above) may also be possible.

In a third enhancement, non-zero probabilities to act as the first acting proxy are ensured for all in-range early-action capable proxy devices. In an example of this third enhancement, a design context is assumed, in which all early-action capable proxy devices P1 . . . Pn will, on receipt of a message from the restricted device, wait a proxy-specific delay time WT1 . . . WTn before attempting to be the first one to access the wireless medium to act as a proxy device, while at the same time monitoring the medium to see if another proxy device has already acted first. Such a mechanism exists for example in the upcoming ZGP specification. In this enhancement, the forwarding algorithm may be adapted in such a way that no single proxy device, or group of proxy devices, will always be the first to act of behalf of the restricted device, no matter what network topology is used or what the reliability indicators of particular proxy devices are.

In a first proposed implementation of the third enhancement, the computation of proxy-specific delay time in each other proxy device could be controlled so that each proxy device will occasionally get a chance of forwarding. As one proposed construction measure, a random component could be incorporated into the proxy-specific delay time, with each proxy device using its own random number generator not synchronized with any other of the random number generators, so that, as a result, the different values of the proxy-specific delay time are somewhat evenly distributed each time.

In a second proposed implementation of the third enhancement, each early-action capable proxy device keeps track of how recently it has acted as the first (forwarding) proxy for the concerned restricted device. When it next detects a message from restricted device, it includes in the calculation of its proxy-specific delay time a component that is dependent on this information. For example, if the proxy device has acted as the first (forwarding) proxy just previously, it will add a (large) component to its proxy-specific delay time, to give other proxy devices more opportunity to act first. If it has not acted as the first (forwarding) proxy for a while, it will not add a (large) component anymore, making it more likely that it will act first again itself, or it may even subtract some time component. Other calculation strategies for the proxy-specific delay time can also be used, e.g. the longer ago it was that the proxy device acted first, the shorter the proxy-specific delay time.

If a mechanism like the above, that ensures non-zero opportunities for all early action capable proxy devices to act as the first acting proxy, is in place, then it is possible to take the following approach based on a fourth embodiment to manage the population of active proxies for each restricted device.

The fourth embodiment is directed to an approach of managing the proxy population without direct proxy counting. Some table managing entity, e.g. each proxy device itself, keeps track of, or approximates, a ratio Ratio·Py(Rx) between the times the proxy device (Py) has acted as the first acting proxy for the restricted device (Rx), and the times that the restricted device has made a transmission, all counted over a time period T. Thus:

$$\text{Ratio·}Py(Rx)=RL/RR \quad (2)$$

where RL denotes the number of times that the proxy (Py) has acted as the proxy for the restricted device (Rx) during the time period T, and RR denotes the number of times that the restricted device (Rx) sent a message during the time period T. This ratio may also be approximated by the proxy device by locally listening for transmissions received from the restricted device in relation to the total number of transmissions made by the restricted device (i.e. including also the transmissions missed by this proxy), and using this count as the right hand side of the equation. If this ratio of the proxy device having acted exceeds a threshold, say 50%, then the table managing entity takes actions to create more early-action capable proxies for the restricted device. The threshold is preferably related to Mx, being the optimal number of proxies for this restricted device Rx, which in turn may be related to this restricted devices application and/or capabilities, as described before. E.g., the threshold could be [100%/Mx]. It is noted that it will usually be beneficial to do the threshold test only after some minimal amount of statistics data has been accumulated, say only after the RL and/or RR count on the right hand side count of the above equation (2) has reached a given minimum value, e.g., at least 3. The approach according to the second embodiment can be called 'without direct counting' because the value 1/Ratio·Py(Rx) is used in this approach to approximate the number of early-action capable proxy devices for the restricted device. This approach can be improved if there is an equalizing mechanism in place (such as the above third enhancement of the first to third embodiments) that makes each early-action capable proxy device somewhat equally likely to act.

In the fourth embodiment, a proxy device may track its own ratio Ratio·Py(Rx). If the ratio exceeds an (upper) threshold, the proxy device may send a message that causes other early-action capable proxy devices in its vicinity to be created. For example, in the context of the upcoming ZGP specification, a certain message could be emitted, as described above in the section 'Ways of adding new active proxies'. As an alternative, the proxy device may send information about its ratio to the restricted device and/or sink device with some of the messages it already needs to send, for example when acting as the first acting proxy for a restricted device, and other proxies receiving such messages can process this ratio information.

If a non-early-action capable proxy device notices that the ratio of another proxy device is above a threshold, while it itself is also in range of the restricted device, it may take action to become an early-acting proxy for the restricted device itself. The decision of the non-early-action capable proxy to take such an action could also be based on factors like available space in its own proxy table, its capabilities, or availability table entries that can be dropped without affecting system performance, e.g., with very low ratios or "trial" entries. A comparison of received signal strength indicators or distance indicators between the restricted device and another proxy device, and the restricted device and the non-early-action capable proxy, may also play a role.

In yet another example, if the ratio exceeds the threshold, the proxy device may inform another entity, that may trigger other actions described in the section 'Ways of adding new active proxies' of the ZGP specification.

As a further option, if the ratio drops below a (lower) threshold, the table managing entity, which may or may not be the proxy itself, may take action to remove the proxy table entry for the restricted device from the proxy device, or to make it a strong candidate for removal, while also optionally stopping to act as an early-action capable proxy device for this node, or adding a large time component to its proxy-specific delay time as defined above. In addition, additional criteria including reliability indicators, e.g. number of commands from the restricted device (recently or consecutively) missed and/or distance to or RSSI/LQI from the restricted device, or other proxy status and/or capability information can be taken into account for the proxy table cleaning.

An exemplary implementation assumes a fixed lower bound threshold, and dropping or marking as candidate for dropping the proxy table entry of the restricted device in the proxy device as soon as the ration Ratio·Py(Rx) drops below this threshold. For example, if the threshold is 25% (i.e. the optimal number of proxies for this Rx, Mx is 100%/25%=4 proxies), it will ensure that, in a situation where 5 or more proxies are in range of a restricted device, have a proxy table entry for this restricted device, and if opportunities for early-action among early-action capable in-range proxies are equalized, the size of the population of active proxies will tend to become stable around 4 (i.e. 1/0.25). A stabilization around a low number of proxies may be beneficial because it will keep some proxy table entries free to deal with changes and mobile restricted nodes, and will make the system quicker in responding to change in general. There is a risk in this solution that multiple proxies may somewhat simultaneously determine that their ratios are below the threshold, causing the proxy population for the restricted device to suddenly shrink to a very small size. In most situations, this risk will not occur, as long as the ratio test is not done too early. In such situations, the natural randomness of the system, and especially taking into account the additional criteria, e.g. the reliability indicator, will ensure that it is unlikely that many proxies will drop below the threshold almost at the same time. A stabilization around a higher number of proxies may be beneficial to increase the chance delivery of every message.

To guard against extreme situations, it can be beneficial to add the extra measure that if a proxy device drops the restricted device from its table, it sends a broadcast message to that effect, with the other proxy devices being set up to receive and process this broadcast message. One way to process the message for example is for a proxy device to adjust its counters for computing its own ratio, in such a way as to temporary increase the ratio.

According to the fourth embodiment, a configuration mechanism for one or more ratio thresholds can be provided in each proxy device, so that they can be configured based on knowledge about the number of restricted devices and/or the number of proxy devices in the system. This configuration can happen for example by a system installer, or it may be applied in real time by a tool or monitoring system (e.g. the table managing entity) that collects information about such numbers, and it can also be changed, e.g., due to changing pairing relationships, propagation conditions and/or changing reporting frequency of the restricted device. However, it may also be a fixed parameter. The threshold(s) may have different values per restricted device, restricted device type and/or application, and/or per communication mode used. The proxy or sink or table managing entity may need to keep track of unserviced messages, as well, i.e., messages for which none of the proxies did forward. They can be counted locally or supplied, e.g. by the sink or the table managing entity.

As a generalisation of the above, a proxy device may keep track of the ratio by which it services a restricted device, and may modify a component of its proxy-specific delay time, such that it is larger if the ratio is below a certain threshold value and smaller if the ratio is above a certain threshold value. For example, a proxy device may add 50 ms to its proxy-specific delay time if the ratio is below 20%, or it may add 0 ms if the ratio is above 30%, and (30%-ratio)*2 ms if the ratio is below 30%. This has the effect that proxy devices with lower ratios tend to be less active, leading to a faster stability of the active proxy population.

In at least some of the above embodiments, table managing entities have been used for retrieving and using statistical information. In the following, additional embodiments for collecting and making available statistical information are explained.

According to a fifth embodiment, a proxy device that is not (at the moment) early-action capable for a restricted device is set up (e.g., by building this function in at manufacturing time, or by (dynamically) configuring the proxy device) to monitor transmissions from the restricted device and to collect data about them, e.g., at least one of count of messages received from the restricted device, signal strength (latest, average, . . . ) from the restricted device, latest received frame counter in a message from the restricted device, and count, identities, reliability indicators, capabilities, and/or forwarding ratios of proxy or proxies that were observed recently to be early-acting for the restricted device.

In one implementation of this fifth embodiment, a table managing entity that manages the proxy population for the restricted device may actively retrieve monitoring information about the restricted device from non-early-action capable proxy devices in order to optimize the number of early-action capable proxy devices for the restricted device. In another implementation of this fifth embodiment, the non-early-action capable device may take actions itself to increase the population of the early-action capable proxy devices.

As one example, suppose that for a periodically reporting sensor node as a restricted device, the table managing entity is trying to enforce a policy that only a single early-action capable proxy device in range of the restricted device should exist (such a policy has the effect of lowering network traffic, but at the cost of reliability). It can happen (e.g. due to changes in the environment) that this single proxy device leaves the range of the restricted device. If the table managing entity detects that many messages it expects to get from the restricted device are no longer arriving, it can query some other proxy devices around the restricted device, that have been monitoring the restricted device. By collecting information like the latest received frame counter, the table managing entity can distinguish between the situation 'restricted device is out of range of the proxy device' or 'proxy device is broken and has stopped forwarding' and the situation 'restricted device is broken and has stopped transmitting entirely'. By collecting information about the signal strength from several monitoring proxy devices and comparing it, the table managing entity can choose the best one to become the new early-action capable proxy device for the restricted device.

In the context of the ZGP specification, the table managing entity could set up a proxy device to be non-early-action-capable, but still monitoring, for the restricted device, by creating a proxy table entry that is inactive and valid in the proxy device (cf. ZGP specification, 09-5499-23, section A.3.4.2.2.1, and A.3.5.2.2.2, page 127, line 26-27) or a zgppBlockedZGPDID entry (cf. ZGP specification, 09-5499-23, section A.3.4.2.6). The proxy device will then keep track of the frame counter of the restricted device in its proxy table, which can be read out by the table managing entity with a command or reported occasionally. To make the above described solution more useful, the proxy table may be extended with extra fields. Additionally, this use of inactive and valid proxy table entries would need to be clarified in the specification, or alternatively another (more compact) data structure dedicated to collecting monitoring information can be added.

In many systems, especially those with memory constraints, it is beneficial to provide proxy table management for a restricted device just after the restricted device has transmitted a message. To support such systems, all proxy devices may keep monitoring records of the last N (N>=1) messages they received from restricted devices. An envisaged monitoring record stores some statistical information about one or more received messages from a restricted device. The monitoring record for a certain restricted device is envisaged to have a much smaller memory size than a complete proxy table entry for the restricted device, because a proxy table entry for the restricted device also has to store information needed by the proxy to forward messages from the restricted device to their destination. Each monitoring record may contain at least the identity of the restricted device and optionally, to support some alternatives, at least one of the signal strength at which the message from the restricted device was received, the identity and/or signal strength of any proxy device that was observed to be early-acting, and a frame counter or the L least significant bits of the frame counter. This information can be used in several ways. First, a table managing entity that wants to add more proxy devices for the restricted device can query some or all proxy devices to get these monitoring records, and select the best proxy device(s) to add. Second, a table managing entity that wants to add more proxies for the restricted device might do so by sending a broadcast or groupcast message, instructing all proxy devices receiving it to check if they have the restricted device in their records, and then take some action if the restricted device is present, and optionally if some other criteria are also met (e.g. the restricted device is in range of the proxy, which can e.g. be derived by comparing the sequence number or frame counter included in the message with the corresponding value of the monitoring records).

In the context of the ZGP specification, such instructions could take the form of an extra flag in the ZGP Pairing command.

One possible action for proxy devices to execute conditionally may be adding the restricted device to their proxy table. Making this action conditional provides the advantage that the creation of proxy table entries in proxy devices that are out of range of the restricted device is avoided. Another possible action for the proxy devices is to take actions that cause some or all of them to announce themselves to the table managing entity, e.g., to send a unicast message to the table managing entity.

One possible action that could be requested may be for the non-early-action capable proxy devices that have the restricted device in their proxy table or monitoring records to initiate discovery for the restricted device. The discovery mechanism allows a sink to select a one or more proxy device(s) among all that do discovery, and appoint that one/them as a new early-action capable proxy device(s). Advantageously, the use of discovery instead of unicast will often create less network traffic, and will also require fewer new extensions to the code base of ZGP implementations. Also, if this solution is used, the table managing entity that decides that more proxy devices are needed might be a different entity from the one selecting the new proxy device(s).

According to a sixth embodiment, proxy table entries may be managed by re-creation. In this sixth embodiment, proxy table entries have limited lifetime, and the table lifetime management policy is known to the table managing entity. The lifetime can be expressed in time units (e.g. 48 hours), in absolute time point (e.g. valid until Oct. 12, 2012, 18:00 CET) or in number of messages to be received from/forwarded on behalf of the restricted device (e.g. 1000 messages or up to and including frame counter 0x87654321). Thus, at or before the expiration of the entry lifetime the table managing entity may create new table entries in selected proxy devices. In another implementation, at or before the expiration of the entry lifetime, the proxies trigger the renewal procedure, e.g. by sending a broadcast or groupcast search command, e.g. to contact the sinks, and/or by sending a unicast command, e.g. to contact the sinks or the central maintenance entity.

To summarize, several techniques have been described for managing the contents of proxy tables in ways that optimize performance, latency, and reliability for communication networks, while ensuring a certain number of early-action capable proxies per restricted device. An entity is allowed to keep a required number of proxies per resource-restricted device by removing or adding proxy table entries. Furthermore, the entity is allowed to keep track of early-action capable proxies based on forwarding strategies, reporting strategies and/or polling strategies. Thereby, proxy table entries can be controlled to optimise overall system performance and reliability characteristics. The entity can be included in one or many devices involved in restricted device communication, like early-action capable proxies, non-early action capable proxies and/or sinks, and provide local optimisation. The entity can be included in one or more dedicated devices, like controllers, maintenance, configuration or management devices, and provide global optimisation.

It is further noted that the proxy device may be and thus the claimed methods are applicable to any device performing a relay function for the restricted device. For example, in ZGP specification, it can be any of the following device types: ZGP Proxy, ZGP Proxy Minimum, ZGP Combo, performing the relay function based on the information in its proxy table; and ZGP Combo Minimum, performing the relay function based on the information in its sink table.

While the invention has been illustrated and described in detail in the drawings and foregoing description, such illustration and description are to be considered illustrative or exemplary and not restrictive. The invention is not limited to the disclosed embodiment. Even though the embodiments are mostly described using the examples of ZigBee Green Power, the invention is applicable to any networks with resource-restricted devices, including regular ZigBee networks, 6LoWPAN networks, Wi-Fi mesh networks, etc.

A proposed application of the present invention may be any building control applications or building management systems including lighting control systems, heating, ventilation and air conditioning systems, blinds control systems, safety, security and access control systems; people and asset tracking; and any other control, sensing, monitoring and automation application benefiting from restricted devices.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. The foregoing description details certain embodiments of the invention. It will be appreciated, however, that no matter how detailed the foregoing appears in text, the invention may be practiced in many ways, and is therefore not limited to the embodiments disclosed. It should be noted that the use of particular terminology when describing certain features or aspects of the invention should not be taken to imply that the terminology is being re-defined herein to be restricted to include any specific characteristics of the features or aspects of the invention with which that terminology is associated.

The invention claimed is:

1. An apparatus for managing a proxy table of a proxy device in a communication network where proxy devices operate as relay devices to forward messages from resource-restricted devices to destination devices,
said proxy table listing the resource-restricted devices on behalf of which each proxy device can forward messages,
said apparatus being adapted to determine for at least one resource-restricted device:
at least the number of proxy devices that have a proxy table entry for said at least one resource-restricted device, or
at least the number of proxy devices which forward messages on behalf of said at least one resource-restricted device,
wherein said apparatus is adapted to initiate an action that causes creation of more proxies with a proxy table entry for or forwarding on behalf of said resource-restricted device, if it has determined at least one of the following conditions: said determined number is below a predetermined lower threshold, the existing proxies do not have sufficient reliability indicators, other proxies do have sufficient or better reliability indicators, the threshold changes, restricted device characteristics change, or change in the pairings.

2. The apparatus according to claim 1, where said apparatus is adapted to determine said number of proxy devices based on proxy table information, received from said proxy devices or other devices in the network and/or based at least in part on observation of the messages sent by at least one of said proxy devices while acting as a relay device for said resource-restricted device.

3. The apparatus according to claim 2, wherein said apparatus is adapted to store said determined number in a proxy counting table, and to drop a proxy device from said proxy counting table in response to a message indicating that said proxy device has dropped said resource-restricted device from its proxy table or stopped forwarding on behalf of it.

4. The apparatus according to claim 1, wherein said apparatus is adapted to initiate removal or marking as candidate for removal of a table entry for or stopping forwarding on behalf of said resource-restricted device from at least one proxy (table), if it has determined at least one of the following conditions: existence of more than a predetermined upper threshold of proxy devices with a proxy table entry for or forwarding on behalf of said resource-restricted device, proxy devices have insufficient reliability indicators, all proxy devices in a given area or of a given capability have full proxy tables, the threshold changes, restricted device characteristics change, change in the pairings.

5. The apparatus according to claim 1, wherein said apparatus is adapted to renew a proxy table entry at or before expiration of a lifetime of said proxy table entry.

6. A method of managing a proxy table of a proxy device in a communication network where proxy devices operate as relay devices to forward messages from resource-restricted devices to destination devices,
said proxy table listing the resource-restricted devices on behalf of which each proxy device can forward messages,
wherein said method comprises determining for at least one resource-restricted device:
the number of proxy devices that have a proxy table entry said at least one resource-restricted device, or
the number of proxy devices which forward messages on behalf of said at least one resource-restricted device based on proxy table information, received from said proxy devices and/or other devices on the network and/or based at least in part on observation of the messages sent by at least one of said proxy devices while acting as a relay device for said resource-restricted device,
the method further comprising initiating an action that causes creation of more proxies with a proxy table entry for or forwarding on behalf of said resource-restricted device, if it has been determined at least one of the following conditions: said determined number is below a predetermined lower threshold, the existing proxies do not have sufficient reliability indicators, other proxies do have sufficient or better reliability indicators, the threshold changes, restricted device characteristics change, or change in the pairings.

7. A non-transitory computer readable medium comprising a computer readable program, wherein the computer readable program when executed on a computer causes the computer to perform the steps of claim 6.

\* \* \* \* \*